Oct. 30, 1923.
W. T. ALFREY
SETWORK
Filed Dec. 6, 1921
1,472,111
3 Sheets-Sheet 2
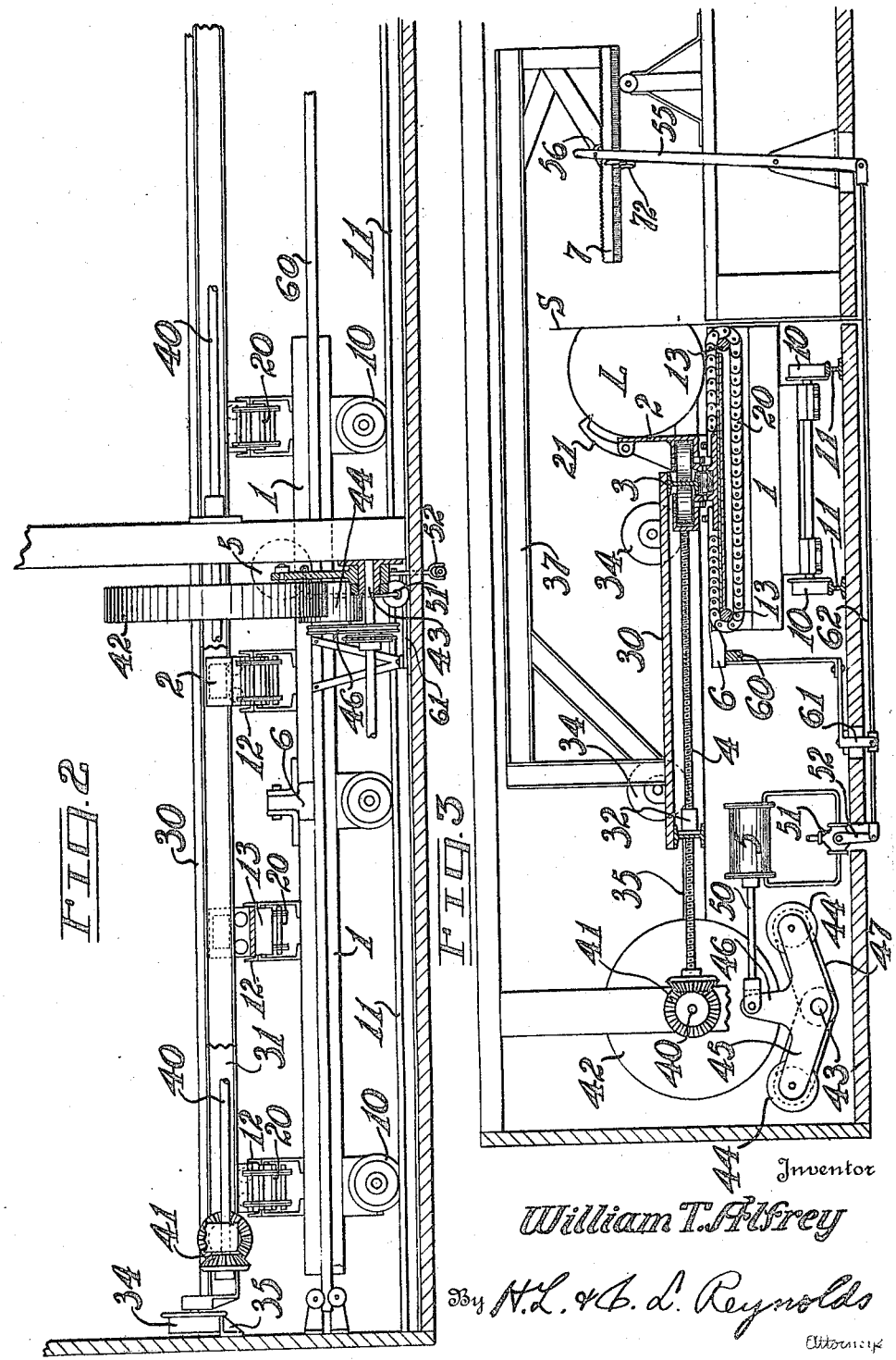
Inventor
William T. Alfrey
By H. L. & C. L. Reynolds
Attorneys

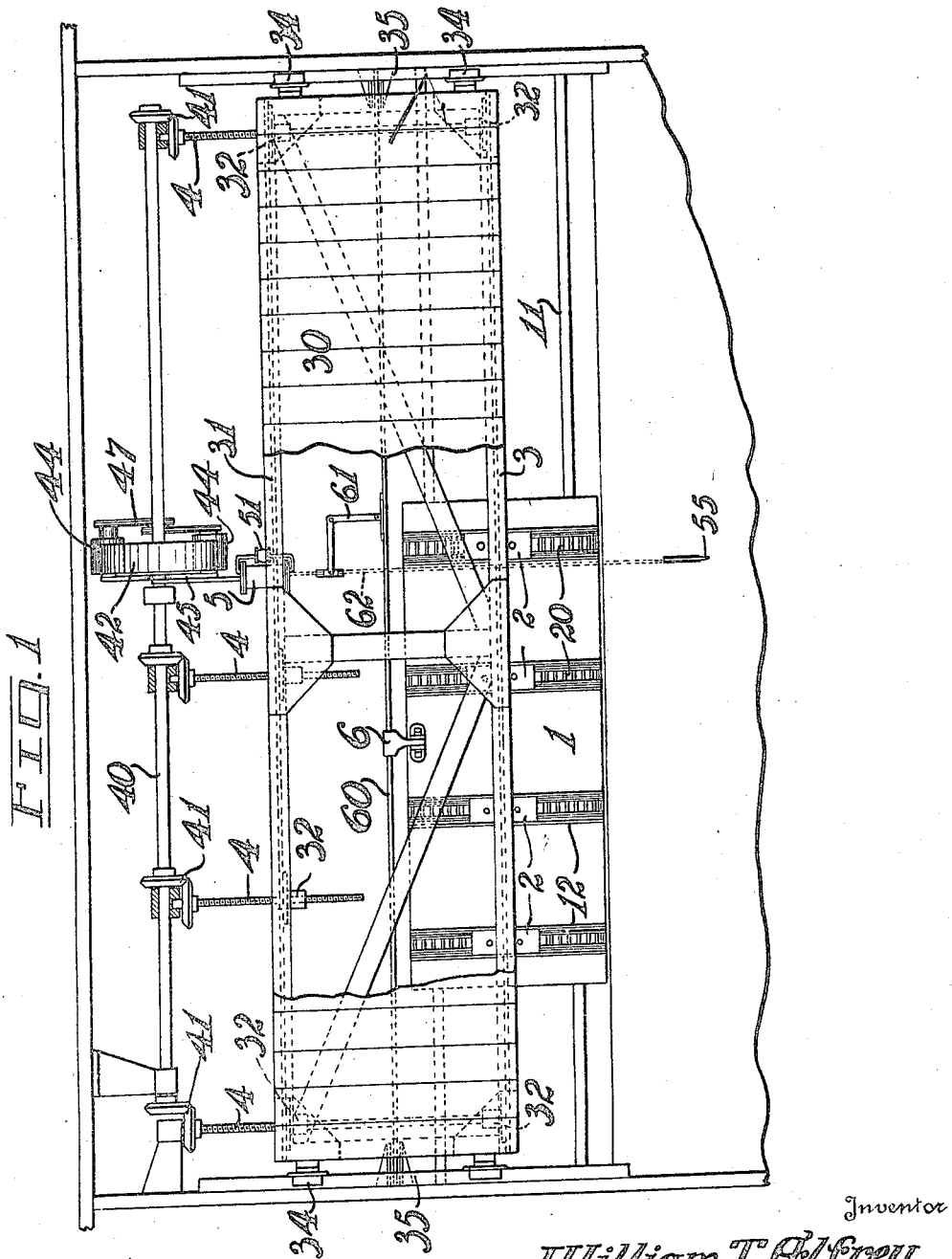

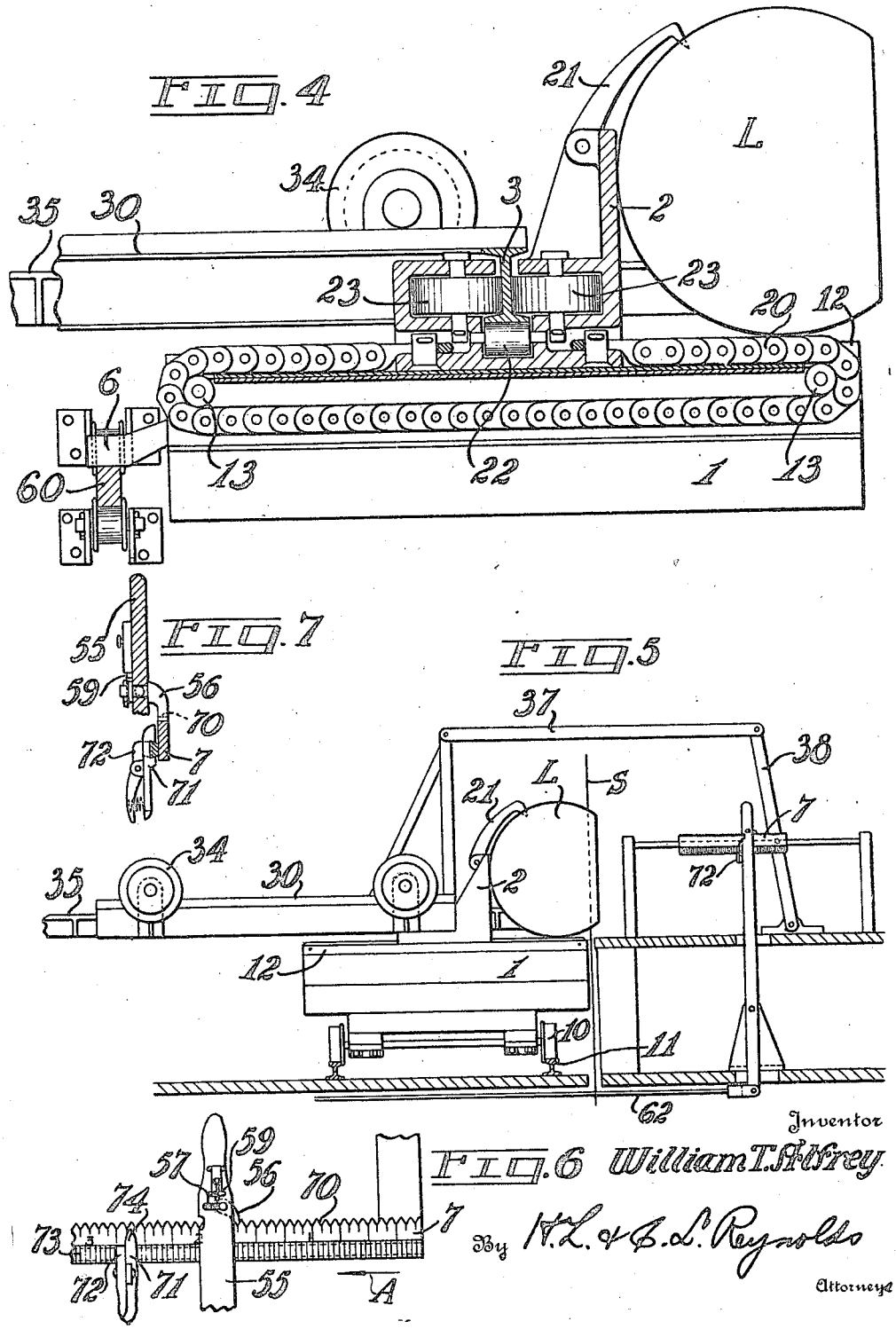

Patented Oct. 30, 1923.

1,472,111

UNITED STATES PATENT OFFICE.

WILLIAM T. ALFREY, OF SEATTLE, WASHINGTON.

SETWORKS.

Application filed December 6, 1921. Serial No. 520,238.

*To all whom it may concern:*

Be it known that I, WILLIAM T. ALFREY, a citizen of the United States of America, and resident of the city of Seattle, in the county of King and State of Washington, have invented certain new and useful Improvements in Setworks, of which the following is a specification.

My invention comprises improvements in apparatus for setting and controlling the position of the knees of a saw mill log carriage.

An object of my invention is to provide means for positioning the log engaging knees so that they are movable transversely upon the carriage proper, entirely independently of the carriage, to the end that irregularities in the carriage trackway or swaying of the carriage will not affect the position of the knees, and thus insuring that a perfectly straight cut is taken from the log.

A further object is to provide means which are controlled externally of the carriage for setting the knees forward or backward.

A further object is to provide an automatic set and offset for such knees operable upon the forward and return stroke of the carriage, and associated with this, it is my object to limit the offsetting action to a predetermined distance.

Another object is to provide manually-controlled means for limiting the automatic setting up of the knees to any desired distance.

A further object is to support the log so that movements forward or backward thereof, as controlled by the knees, will not affect the position of the log relative to the knees or to its supports.

My invention comprises those novel parts and combinations thereof which are shown in the accompanying drawings, described in the specification, and particularly defined by the claims terminating the same.

In the accompanying drawings I have shown my invention in forms which are now preferred by me.

Figure 1 is a plan view of my set-works, parts thereof being broken away.

Figure 2 is a rear elevation thereof.

Figure 3 is a transverse section therethrough.

Figure 4 is a transverse section through the carriage and the log supporting means which are supported thereon.

Figure 5 is a transverse section through a slightly modified set-works.

Figures 6 and 7 are, respectively, elevation and transverse section of a detail of the controlling and automatic-offsetting apparatus.

The saw mill carriage 1, the wheels 10 of which are guided by tracks 11 upon the floor, carries the log L past the circular or band saw S. Upon this carriage 1 knees 2 are supported in suitable guides 12 for movement transversely of the carriage. These knees may, if desired, be provided with a chain 20 which is secured by one end to one side of the knee and which extends over suitable sheaves or sprocket wheels 13 at opposite ends of the guides 12 thence beneath the guides and to a connection at the opposite side of the knee 2. Thus as the knee 2 moves the chain 20 moves with it. The knee may be provided with any suitable type of log-engaging dogs, herein shown at 21.

The knee 2 is merely supported upon the carriage 1, but its position is not controlled by any agency thereupon. Its transverse movement is controlled by its engagement with a guide rail 3. This guide rail is suitably engaged with a knee 2, preferably by means of rollers 23 engaging its lateral faces and a roller 22 supporting it from beneath, all of which are journaled in the knee 2. Any other suitable means for reducing the friction, however, may be employed. The guide rail 3 is suitably supported at its ends and is movable bodily transversely of the direction of movement of the carriage 1, the rail itself extending parallel with the direction of movement of the carriage.

The guide rail 3 is suitably controlled to move across the line of travel of the carriage 1 and, as shown herein, forms the outer rail of a platform 30, the inner side rail 31 of which, or the guide rail 3, has secured thereto a number of nuts 32. These nuts each receive a screw 4, all of these screws being of equal pitch and each being connected to a counter shaft 40 to be rotated simultaneously and equally thereby. The bevel gears 41 form a convenient connection for this purpose. The platform 30 may be supported upon rollers 34 running upon transverse trackways 35, or the platform and guide rail 3 may be otherwise suitably supported.

Frictional driving means are preferably employed for controlling the screws 4, although a more direct actuation may be employed if desired. Upon the counter-shaft 40 is secured a large friction wheel 42. A line shaft 43 lies adjacent the counter-shaft 40. A pair of oppositely rotating friction pinions 44 are supported upon opposite arms of a bracket 45 which is pivoted about the line shaft 43, the pinions 44 being driven by belts 47 from a suitable pinion upon the line shaft 43. The bracket 45 is provided with a control arm 46 which in turn is connected to the piston rod 50 of a double-acting control cylinder 5.

The operation of the screws 4 may be accomplished from some suitable source of power, as for instance, by the use of the cylinder 5, the piston of which may be conveniently operated by compressed air, one or the other of the pinions 44 may be brought into contact with the friction wheel 42 to rotate this wheel in one direction or the other and consequently to rotate the screws 4 in one direction or the other. Such rotation of the screws 4, acting each in its nut 32, moves the entire platform 30, which may be as large or as small as is required, and the guide rail 3 inwardly or outwardly, that is, transversely of the direction of movement of the carriage 1 and in a direction to advance the log toward or retract it from the plane of the saw S.

The carriage 1, as it moves along its tracks 11, may sway, or the track or its supports may be warped out of a straight line as is often the case with light rails and where they are exposed to disturbing influences. Inasmuch as the carriage merely supports the knees 2 and the log L, this sidewise movement of the carriage will have no effect upon the position of the log, for the knees, which back the log, are maintained by the guide rail 3 in a given position relatively to the plane of the saw S. The knees 2 merely slide longitudinally of the guide rail 3, and if the carriage sways, they slide transversely of the carriage in the guides 12 enough to neutralize this swaying. The result is an exactly straight cut, instead of a wavering cut.

I have provided automatic means for offsetting and setting the log L as the carriage 1 returns to its original position for a new cut. Unless the log is moved back from the saw S there is interference between the log and saw on the return movement. In order to accomplish this I support a shoe 6, preferably pivotally, from the carriage 1 and in position to bear upon a light sliding rail 60 extending parallel to the direction of movement of the carriage 1. As the carriage moves the weight of the shoe 6 moves the rail 60 in one direction or the other corresponding to the direction of movement of the carriage 1, and this movement of the rail 60 is suitably communicated to the valve 51 controlling the admission of air to the cylinder 5, as through a bell-crank lever 61 having one arm connected to be moved by the rail 60, and its other end connected to move a link 62 which is secured to the control arm 52.

On the advance movement of the carriage the valve 51 is moved by movement of the rail 60 to admit air into the cylinder 5 sufficiently to cause contact of one of the friction pinions 44 with the friction wheel 42, and thus to cause an advance rotation of the setting screws 4, but on reversal of the carriage movement of the rail 60 in the opposite direction causes reversal of the valve setting, and consequently reversal of the movement of the screws 4. The result is offsetting of the knees 2, instead of setting up thereof.

The offsetting required for proper operation need not in most cases exceed an inch and I have therefore provided means whereby the offsetting action is automatically stopped after the desired offset has been attained. It is also desirable that means be provided for automatically stopping the setting up action when the desired set has been attained. These devices may also be employed as an indicator or in connection with an indicator, and I shall therefore describe them in such connection.

An indicator rule 7 is supported from an extension 37 of the platform 30 to move with the platform. This rule 7 is preferably, but not necessarily, positioned adjacent the sawyer's station. A control or throttle lever 55 is also positioned adjacent the rule 7 and is connected to the link 62 which is secured to the valve control lever 52. One surface of the rule 7 is provided with teeth 70, and a dog 56 secured upon the control lever 55 engages the teeth 70. The dog 56, which may be disengaged from or locked in engagement with the teeth 70 when desired, as by means of the bolt 59, is preferably supported in the lever 55 to slide in a direction parallel to the movement of the rule 7, being held in normal or projected position by a spring 57.

As offsetting of the rail 3 and platform 30, initiated by the movement of the sliding rail 60, is begun, the rule 7 moves in the direction of the arrow A in Figure 6. The movement of the rule 7, due to the engagement of the dog 56 with one of the teeth 70, forces the dog 56 to the far end of its slot 57 and then moves the control lever 55 in the direction of the arrow. To permit such movement of the dog the bolt 59 must, of course, be withdrawn. Such movement of the control lever is communicated to the valve control arm 52 to place this in neutral position and to stop the reverse rotation of the setting screws 4. Obviously the distance the dog 56 travels in its slot 57 prior to movement of the control lever 55 determines the amount of offsetting which occurs, and this may be varied to suit the conditions of operation. If the bolt 59 locks the dog against such movement, no offsetting will occur.

I have combined with this rule 7 an automatic setting stop. A slide 71 is supported upon the rule 7, the latter being marked off in proper units. The slide 71 is provided with a releasable dog 72 which is engageable with a series of teeth 73 upon the rule. A pointer 74 upon the slide 71 cooperates with the scale upon the rule 7. The slide 71 is first moved to the left in Figure 6 the width of the cut next desired. Movement of the guide rail 3 and rule 7 to the right is then initiated through movement of the sliding rails 60 in the opposite direction under the influence of movement of the carriage 1 in the opposite direction, thus moving the valve arm 52 and the lever 55 to the left to operate the setting screws 4 in the setting direction. As the now fixedly-positioned slide 71 contacts with the control lever 55 the latter is moved into neutral position and the movement of the setting screws 4 is stopped.

In order to make the automatic control most effective, the chains 20 which are connected to the knees 2 should be raised somewhat above their guides 12 and the log L should rest directly upon these chains. The chains 20 move with the knees 2 and consequently the log, resting upon the chains 20, will have no tendency to roll over as the knees move in or out and the necessity for a complicated dogging system is thus eliminated.

The modification of the control apparatus shown in Figure 5 serves to reduce the movement of the rule 7 required for actuation of the automatic control. The rule 7 is supported for a sliding movement instead of being supported from the extension 37 and a lever 38 is pivoted to the extension 37 and to the rule 7. In other respects the action of this apparatus is similar to that described above.

What I claim as my invention is:

1. In a sawmill set-works, the combination with a longitudinally-movable carriage, of knees transversely movable thereon, and a longitudinally extending, transversely movable guide rail having guiding engagement with the bases of said knees to control their transverse position relative to the carriage.

2. In a sawmill set works, the combination with a longitudinally movable carriage, of knees transversely movable thereon, a guide rail, said knees and the guide rail having complemental guiding engagement adapted to control the transverse position of the knees independently of the carriage, and means for controlling the position of the guide rail transversely of the carriage positioned at the same side of the plane of the saw as are the knees.

3. In a sawmill set works, the combination with a longitudinally movable carriage, of transversely-extending guides thereon, knees guided in said transverse guides for movement transversely of the carriage, a longitudinally-extending guide rail positioned adjacent the plane of said transverse guides, and engageable by said knees to control their position transversely of the carriage, and means independent of the carriage for transversely moving said guide rail.

4. In a sawmill set works, the combination with a longitudinally movable carriage, of knees transversely movable thereon, a longitudinally extending, transversely movable guide rail positioned above the carriage, and engageable with said knees to control their transverse position independently of the carriage, and a platform secured to move with said guide rail, and covering all parts of the carriage inward of the knees at all points of its travel.

5. In a sawmill set-works, the combination with a longitudinally movable carriage, of log-positioning means transversely movable thereon, guide means for said log-positioning means for controlling the position thereof relative to and independently of the carriage, and means for automatically offsetting the log-positioning means as the carriage begins its return travel after a cut.

6. A device as in claim 5, including means extending across the plane of the saw for controlling the operation of the offsetting means from the sawyer's station.

7. In a sawmill set-works, the combination with a longitudinally movable carriage, of knees transversely movable thereon, a longitudinally extending, transversely movable guide rail for controlling the position of the knees relative to the carriage, nuts secured to move with the guide rail, a screw rotatable within each nut to vary the position of the guide rail and knees upon the carriage, and means operable by the return travel of the carriage after a cut for automatically offsetting the guide rail and knees.

8. A device as in claim 7, said offsetting means including a power connection and a control therefor, and a connection between said control and the guide rail, and operable by movement of the guide rail to operate said control to limit automatically the amount of offsetting.

9. A device as in claim 7, offsetting means including a power connection and a control lever connected thereto, means connecting the control lever and guide rail, and including a lost motion connection, said connection means being operable through movement of the rail after the termination of lost motion to move said control lever in a direction to stop the offsetting.

10. A device as in claim 7, said offsetting means including a power connection and a control therefor, and a connection between said control and the guide rail, and operable by movement of the guide rail to operate said control, said latter connection including a manually-settable means for automatically controlling and limiting the setting of the knees.

11. A device as in claim 7, the automatic offsetting means comprising means for reversing the rotation of said screws, control means therefor, a slidable rail for actuating said control means, and a shoe movable with the carriage and frictionally engaging said slidable rail to move it correspondingly with the carriage.

12. In a sawmill set-works, automatic setting control means including a slidable rail positioned adjacent to the carriage and parallel the path thereof, and a shoe supported from the carriage and frictionally engageable with said rail.

13. In a sawmill set-works, the combination with setting mechanism of reversing mechanism therefor, a slidable rail positioned adjacent to the carriage and parallel to its path of movement, a shoe supported from the carriage and frictionally engageable with said rail, and a connection between said rail and the reversing mechanism, operable upon return movement of the carriage to throw the reversing mechanism into operation.

14. A device as in claim 1 having an indicator rule movable in accordance with the movement of the guide rail, a setting control lever, offsetting mechanism operable by a return movement of the carriage after a cut, and means engageable between said control lever and the rule operable to stop the offsetting mechanism after a predetermined offset has been attained.

15. A device as in claim 1 having an indicator rule movable in accordance with the movement of the guide rail, a setting control lever, offsetting mechanism operable by a return movement of the carriage after a cut, and a dog engageable with said rule by offsetting movement thereof, said dog being supported from said control lever for a limited movement relative thereto in the offsetting direction.

16. In a sawmill set-works, automatic control means for an offset mechanism, comprising a member movable in accordance with the setting of the knees, a setting control lever, and means engageable between said control lever and the movable member upon movement of the latter in the offsetting direction, and operable to stop the offset mechanism after a predetermined offset has been attained.

17. In a sawmill set works, the combination with a longitudinally movable carriage, of log-positioning means transversely movable thereon, guide means connected with said log-positioning means to control the position thereof relative to and independently of the carriage, and means operable at any point in the carriage's travel for automatically setting up the log-positioning means as the carriage begins its advance movement.

18. In a sawmill set works, the combination with a longitudinally movable carriage, of knees transversely movable thereon, a longitudinally extending, transversely movable guide rail connected with said knees to control their position relative to the carriage, means for controlling the lateral position of the guide rail, and means controlled by the advance and return movements of the carriage, and operable at any point in the carriage's travel, for automatically setting up and offsetting, respectively, the guide rail.

Signed at Seattle, King County, Washington, this 26th day of November, 1921.

WILLIAM T. ALFREY.